United States Patent
Karlsson

(10) Patent No.: US 7,995,549 B2
(45) Date of Patent: Aug. 9, 2011

(54) SETTING AN UPLINK TRANSMISSION RATE LIMIT FOR MOBILE TERMINALS TRANSMITTING OVER A HIGH SPEED DOWNLINK SHARED CHANNEL

(75) Inventor: Patrik Karlsson, Alta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 733 days.

(21) Appl. No.: 11/720,475

(22) PCT Filed: Dec. 3, 2004

(86) PCT No.: PCT/SE2004/001801
§ 371 (c)(1), (2), (4) Date: May 30, 2007

(87) PCT Pub. No.: WO2006/059933
PCT Pub. Date: Jun. 8, 2006

(65) Prior Publication Data
US 2008/0123542 A1 May 29, 2008

(51) Int. Cl.
H04B 7/216 (2006.01)
H04B 17/00 (2006.01)
(52) U.S. Cl. ........................ 370/342; 370/355; 455/67.13
(58) Field of Classification Search ........................ None
See application file for complete search history.

(56) References Cited

U.S. PATENT DOCUMENTS

| | | | |
|---|---|---|---|
| 6,219,343 B1 | 4/2001 | Honkasalo et al. | |
| 2002/0151310 A1* | 10/2002 | Chung et al. | 455/452 |
| 2002/0181394 A1 | 12/2002 | Partain et al. | |
| 2003/0045288 A1* | 3/2003 | Luschi et al. | 455/434 |
| 2003/0219037 A1* | 11/2003 | Toskala et al. | 370/496 |
| 2003/0220119 A1* | 11/2003 | Terry | 455/466 |
| 2004/0106431 A1* | 6/2004 | Laroia et al. | 455/552.1 |
| 2004/0110473 A1 | 6/2004 | Rudolf et al. | |
| 2004/0160923 A1* | 8/2004 | Nobukiyo et al. | 370/335 |
| 2004/0202136 A1* | 10/2004 | Attar et al. | 370/333 |
| 2004/0224677 A1* | 11/2004 | Kuchibhotla et al. | 455/422.1 |
| 2005/0047393 A1* | 3/2005 | Liu | 370/352 |
| 2005/0128993 A1* | 6/2005 | Yu et al. | 370/342 |
| 2005/0141421 A1* | 6/2005 | Ishii et al. | 370/230 |
| 2006/0133402 A1* | 6/2006 | Dottling et al. | 370/431 |

(Continued)

FOREIGN PATENT DOCUMENTS

CN 1330496 1/2002

(Continued)

OTHER PUBLICATIONS

Norikuyi Fukui et al: "Study of Channel Fedback in UMTS HSDPA" 14th IEEE 2003 International Symposium on Personal Indoor and Mobile Radio Communication Proceedings, vol. 1, Sep. 7, 2003, pp. 336-340, XP010681613.

*Primary Examiner* — Ricky Ngo
*Assistant Examiner* — Clemence Han

(57) ABSTRACT

A method, apparatus, and system for setting an uplink transmission rate limit for a mobile terminal operating in a mobile communications network in which the mobile terminal receives downlink transmissions over a high speed downlink shared channel. The mobile terminal measures a downlink channel quality (CQI), and sends the CQI to the network. The network utilizes the measured CQI to determine an uplink data transmission rate limit for the mobile terminal.

21 Claims, 4 Drawing Sheets

U.S. PATENT DOCUMENTS

| | | | | |
|---|---|---|---|---|
| 2006/0171478 A1* | 8/2006 | Schotten et al. | | 375/259 |
| 2007/0155388 A1* | 7/2007 | Petrovic et al. | | 455/442 |
| 2008/0062932 A1* | 3/2008 | Hwang | | 370/331 |
| 2009/0016278 A1* | 1/2009 | Wakabayashi | | 370/329 |

FOREIGN PATENT DOCUMENTS

| | | |
|---|---|---|
| CN | 1330496 A | 1/2009 |
| WO | WO 03/105362 A1 | 12/2003 |
| WO | WO 2004/045239 A2 | 5/2004 |

* cited by examiner

--Prior Art--

--Prior Art--

--Prior Art--

--Prior Art--

SETTING AN UPLINK TRANSMISSION RATE LIMIT FOR MOBILE TERMINALS TRANSMITTING OVER A HIGH SPEED DOWNLINK SHARED CHANNEL

TECHNICAL FIELD

The present invention field relates to wireless communications, and more particularly, to high speed packet transmissions over a high speed downlink shared channel managed by a radio access network (RAN).

BACKGROUND AND SUMMARY

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. As wireless Internet services have become popular, various services require higher data rates and higher capacity. Although UMTS has been designed to support multi-media wireless services, the maximum data rate is not enough to satisfy the required quality of services. Therefore, efforts have been directed to developing High Speed Downlink Packet Access (HSDPA) for the purpose of providing a maximum data rate of 10 Mbps and to improve the radio capacity in the downlink. HSDPA achieves higher data speeds by shifting some of the radio resource coordination and management responsibilities to the base station from the radio network controller. Those responsibilities include one or more of the following briefly described below: shared channel transmission, higher order modulation, link adaptation, radio channel dependent scheduling, and hybrid-ARQ with soft combining.

In shared channel transmission, radio resources, like spreading codes and transmission power in the case of Code Division Multiple Access (CDMA)-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

Radio channel conditions experienced on different communication links typically vary significantly, both in time and between different positions in the cell. In traditional CDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

For maximum cell throughput, radio resources may be scheduled to the communication link having the best instantaneous channel condition. Rapid channel dependent scheduling performed at the bases station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

FIG. 1 illustrates a high speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals. For example, during the first time interval shown in FIG. 1, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, etc.

High-speed data transmission is achieved by allocating a significant number of spreading codes (i.e., radio resources in CDMA systems) to the HS-DSCH. FIG. 2 illustrates an example code tree with a fixed Spreading Factor (SF) of sixteen. A subset those sixteen codes, e.g., twelve, is allocated to the high-speed shared channel. The remaining spreading codes, e.g., four are shown in the figure, are used for other radio channels like dedicated, common, and broadcast channels.

Although not necessarily preferred, it is also possible to use code multiplexing along with time multiplexing. Code multiplexing may be useful, for example, in low volume transmission situations. FIG. 3 illustrates allocating multiple spreading codes to users 1, 2, and 3 in code and time multiplexed fashion. During transmission time interval (TTI) 1, user 1 employs twelve codes. During transmission time interval 2, user 2 employs twelve spreading codes. However, in transmission time interval 3, user 1 uses two of the codes, and user 3 uses the remaining ten codes. The same code distribution occurs in TTI=4. In TTI=5, user 3 uses two of the codes while user 2 uses the remaining codes.

When the high speed downlink shared channel concept was initially conceived it was in response to the perception that most high data rate applications for 3G mobile terminals would be in the downlink direction, e.g., receiving web pages from the Internet at the mobile terminal, in response to low rate uplink web browser requests from the mobile terminal. The mobile user would likely not subscribe to such a service if the information required long time periods to download using normal data rates. By giving the mobile user a lot of bandwidth for short times when needed, e.g., to download a web page, that mobile user experiences a service approaching that which might be delivered over some fixed wire environments. This kind of asymmetry works well with certain services like web page browsing. But it is less satisfactory for more balanced services, e.g., where a large email is received and forwarded. And some services are particularly demanding in the uplink such as multimedia, interactive gaming, video conferencing, etc.

Thus, it would be desirable to provide a mobile terminal, where possible, the option of transmitting at a higher data rate in the uplink over an uplink channel, e.g., an "enhanced" uplink channel, if that mobile receives or can receive information in the downlink from the network at a high data rate over a high speed downlink channel. Indeed, the mobile user, even though largely unaware of current system load constraints and radio channel conditions, may very much desire and even demand the same or at least similar data transmission rates in both the downlink and the uplink. For example, if a mobile terminal user downloads a graphics file at a fast rate, that user might well expect to be able to send the same graphics file to another person in the uplink at about that same fast rate. Voice-over-IP and interactive gaming are other examples where a high speed data transmission rate for both uplink and downlink is desired. But at the same time, radio resources are limited, so it is not feasible to allow all mobile terminals to transmit at high data rates.

A mobile communications network supports mobile radio communications using radio channels associated with a cell including a high speed downlink shared radio channel for transmitting information from the mobile communications network to mobile terminals and uplink channels for transmitting information from the mobile terminals to the mobile communications network. A radio connection is established between a first mobile terminal receiving information from the mobile communications network over the high speed-downlink shared channel and transmitting information to the mobile communications network over a first uplink channel. A first downlink channel quality associated with a first data transmission of information over the high speed downlink shared radio channel to the first mobile terminal is determined. In a one example, the first downlink channel quality is determined based on information provided by the first mobile terminal. A first uplink data transmission rate limit is then set for information to be transmitted over the first uplink channel by the first mobile terminal based on the first downlink channel quality.

A second downlink channel quality associated with a second data transmission of information over the high speed downlink shared radio channel to a second one of the mobile terminals may also be determined. A second uplink data transmission rate limit for information to be transmitted over a second uplink channel by the second mobile terminal is also determined based on the second downlink channel quality. Assuming that the first downlink channel quality exceeds the second downlink channel quality, the first uplink data transmission rate limit is set greater than the second uplink data transmission rate limit. The first uplink data transmission rate limit is sent to the first mobile terminal, and the second uplink data transmission rate limit is sent to the second mobile terminal.

In one example situation, the first uplink data transmission rate limit correlates with a downlink data transmission rate to the first mobile terminal over the high speed downlink shared radio channel, which may be useful for balanced data communications applications. But the uplink transmission rate limit is not necessarily limited by the actual downlink transmission rate. Moreover, a load associated with the first uplink channel may be determined and also used in the process of determining the first uplink data transmission rate limit. In one example implementation, the first uplink data transmission rate limit is a function of the first downlink channel quality, the load, and a number of mobile terminals transmitting in uplink to the mobile communications network. The first uplink data transmission rate limit may also be a function of one or more additional parameters, e.g., a number of users transmitting.

DETAILED DESCRIPTION

The following description sets forth specific details, such as particular implementations, procedures, techniques, etc. for purposes of explanation and not limitation. It will be appreciated by one skilled in the art that other implementations may be employed a part from these specific details. For example, although the following description is facilitated using non-limiting UMTS examples, the present invention may be employed in any mobile communications network that employs a high speed shared channel. In some instances, detailed descriptions of well-known methods, interfaces, circuits and signaling are omitted so as to not obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific circuitry (ASIC), and/or using one or more digital signal processors (DSPs).

Figure 1:
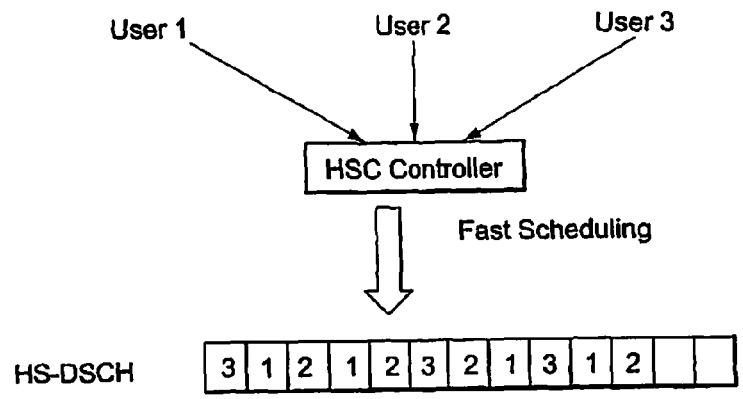
FIG. 1 illustrates conceptually a high speed downlink shared channel.
Figure 2:
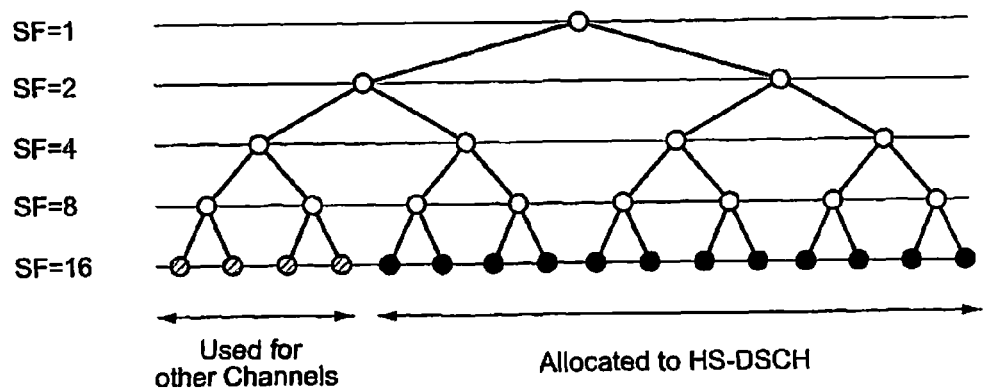
FIG. 2 illustrates a code tree.
Figures 3, 4:
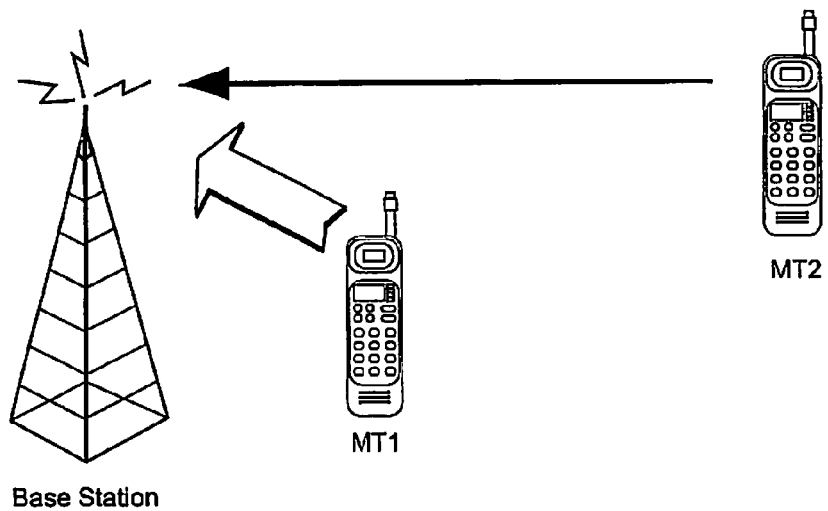
FIG. 3 illustrates a time division code division multiplex diagram in conjunction with the high speed downlink shared channel.
FIG. 4 illustrates two mobile terminals with different high speed downlink shared channel qualities and different transmission rates in the uplink direction.

In general, the mobile communications technology described relates to managing uplink radio resources to correlate an uplink data rate to a potential downlink transmission rate over a high speed downlink shared channel under certain conditions. FIG. 4 illustrates a situation where a base station is communicating with two mobile terminals MT1 and MT2. Mobile terminal MT1 is closer to the base station, and mobile terminal MT2 is farther from the base station. Being relatively close to the base station, a downlink channel condition or quality detected by the mobile terminal MT1 is relatively good compared to the downlink channel condition or quality detected by the mobile terminal MT2, which is relatively far away from the base station. Regardless of distance from the base station, the point here is that the mobile terminal MT1 has a better downlink radio condition as compared to the mobile terminal MT2 with respect to the base station. Channel quality may be determined using any suitable indicator(s) or parameter(s) such as but not limited to signal to noise ratio, signal to interference ratio, received signal strength, etc., and is referred to hereafter generally as channel quality indicator (CQI).

Because the mobile terminal MT1 experiences a higher CQI in the downlink than the mobile terminal MT2, the uplink radio channel conditions are very likely to also be quite good for the mobile terminal MT1. Accordingly, the mobile terminal MT1 is permitted to transmit data in the uplink direction back to the network at a relatively high data transmission rate as indicated by a wide arrow. On the other hand, the far-away mobile terminal MT2 is only permitted to transmit data in the uplink direction back to the network at a relatively low data transmission rate, as indicated by a thin arrow. Because the downlink channel CQI for the mobile terminal MT2 is lower, the uplink radio channel conditions are very likely to also not be quite good. As a result, the uplink resource cost to permit the mobile terminal MT2 to transmit uplink at a high data rate may be higher compared to the resource cost to permit the mobile terminal MT1 to transmit uplink at a high data rate. A high data rate transmission from the mobile terminal MT2 may also create more interference in the cell area being serviced by the base station.

Figure 5:
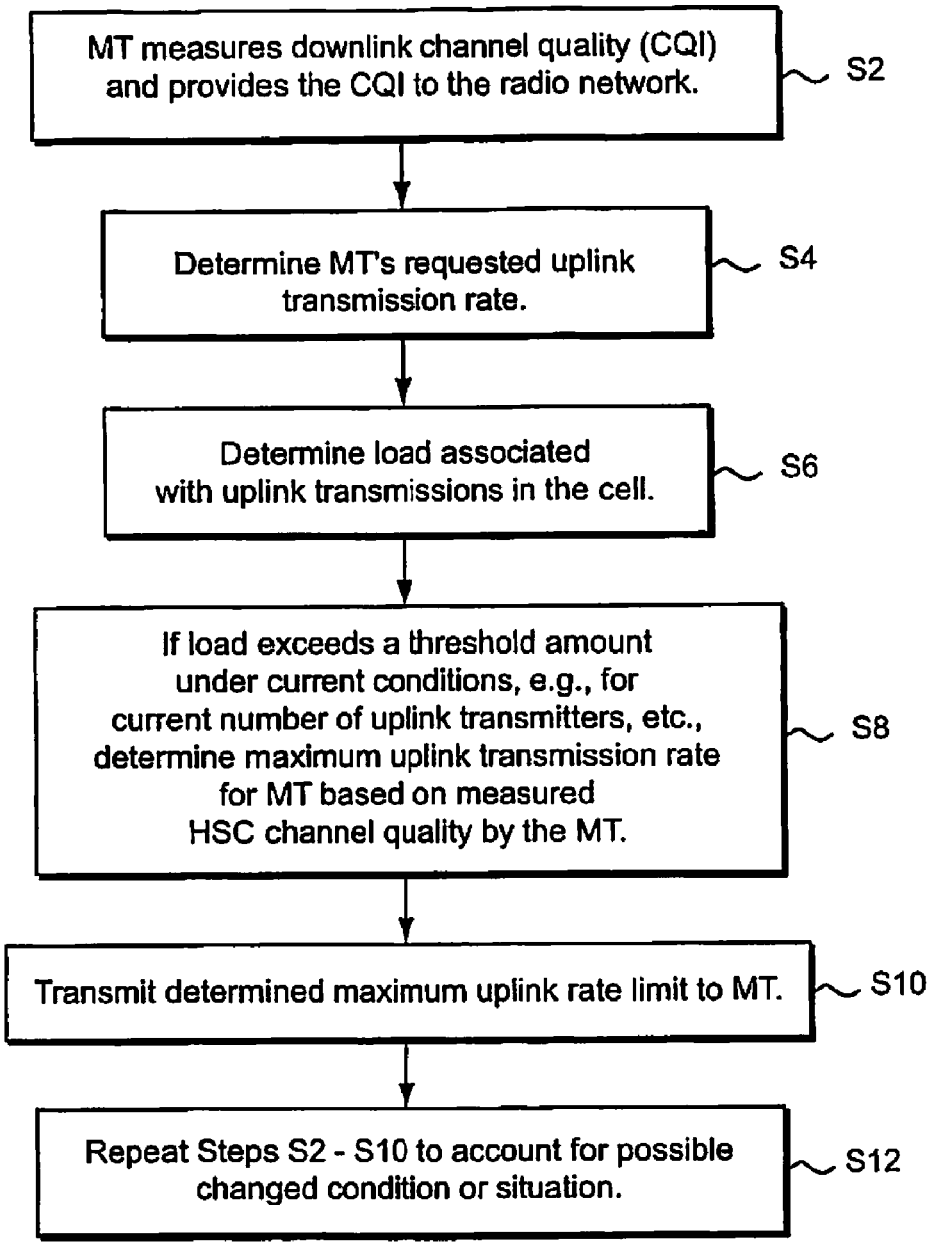
FIG. 5 is a flowchart diagram outlining example procedures for determining an uplink transmission rate limit for a mobile terminal receiving information over a high speed-downlink shared channel.

FIG. 5 is a flowchart illustrating example procedures for setting an uplink transmission rate limit for mobile terminals transmitting over a high speed-downlink shared channel (HS-DSCH). One or more cells in the mobile communications system has an HS-DSCH in addition to other types of radio channels, e.g., dedicated channels, control channels, broadcast channels, etc. Each radio base station has one or more associated cells. Each mobile terminal for which a connection is established and which receives a transmission over the HS-DSCH measures a channel quality of signals received over a downlink channel, such as but not limited to a pilot or broadcast channel transmitted by the base station for the cell, and provides some sort of downlink channel CQI information back to the mobile communications network (step S2). Mobile terminal transmissions in the uplink are assumed for purposes of this non-limiting, example description to take place over an uplink dedicated channel or an "enhanced" uplink dedicated channel. But other types of uplink channels could be used.

Mobile terminals are not permitted to transmit uplink at any power level or transmission rate they might like, and thus, a mobile typically requests a particular uplink rate, either explicitly or by requesting a particular quality of service (step S4). A load associated with uplink transmission in the cell is determined (step S6). Limiting the uplink transmission rate from a mobile terminal may only be necessary when the load is sufficiently high. The load may be a radio resource usage load associated with the cell, an interference level associated with the cell, and/or other load parameter. Other load parameter examples include: hardware utilization, power, number of transmitting users, allocated spreading factors and/or codes, or a data processing load associated with the cell. The detected load is compared to a predetermined load threshold (which could be zero or non-zero), and if it exceeds that threshold under current conditions, e.g., current number of transmitting uplink mobile terminals, etc., the maximum uplink transmission rate limit is determined for each mobile terminal based on a downlink channel quality measured by that mobile terminal (step S8).

One non-limiting example way that this maximum uplink transmission rate limit determination can be made is to monitor the downlink CQI reported by the mobile terminal and scale that CQI relative to a reference rate. The reference rate can be determined by the uplink (UL) load and number of users in a cell. Consider the following, where the nomenclature f( ) means "function of".

$$\text{Uplink rate limit} = f(CQI) * f(\text{load, number of UL mobile users}) \quad (1)$$

where the CQI is the downlink CQI reported by the mobile terminal, load is expressed relative to some threshold, e.g., the load is high when it exceeds the threshold. Consider these examples:

$$f(CQI) = CQI/100 \quad (2)$$

$$CQI = 30 => f(CQI) = 0.3$$

$$CQI = 15 => f(CQI) = 0.15$$

$$f(\text{load, \# users}) \quad (3)$$

$$f(\text{high}, 1) = 10 \text{ Mbps}$$

$$f(\text{high}, 2) = 5 \text{ Mbps}$$

$$(\text{high}, 10) = 1 \text{ Mbps}$$

Using the example where f(CQI)=0.15 and f(high, 1)=10 Mbps, then the uplink rate limit for this mobile terminal is 1.5 Mbps. Other factors could be taken into account, e.g., a subscription associated with the mobile terminal, a priority level associated with the mobile connection, etc.

Returning to FIG. 4, the determined uplink transmission rate limit is conveyed to the mobile terminal, particularly if the determined rate is less than the rate requested by the mobile terminal (step S10). The transmission rates described herein may be any appropriate data rate measure including peak rate, average rate, etc. Steps S2-S10 are preferably repeated to account for possible changes in one or more conditions or situations that would affect the uplink transmission rate setting (step 12).

Figure 6:
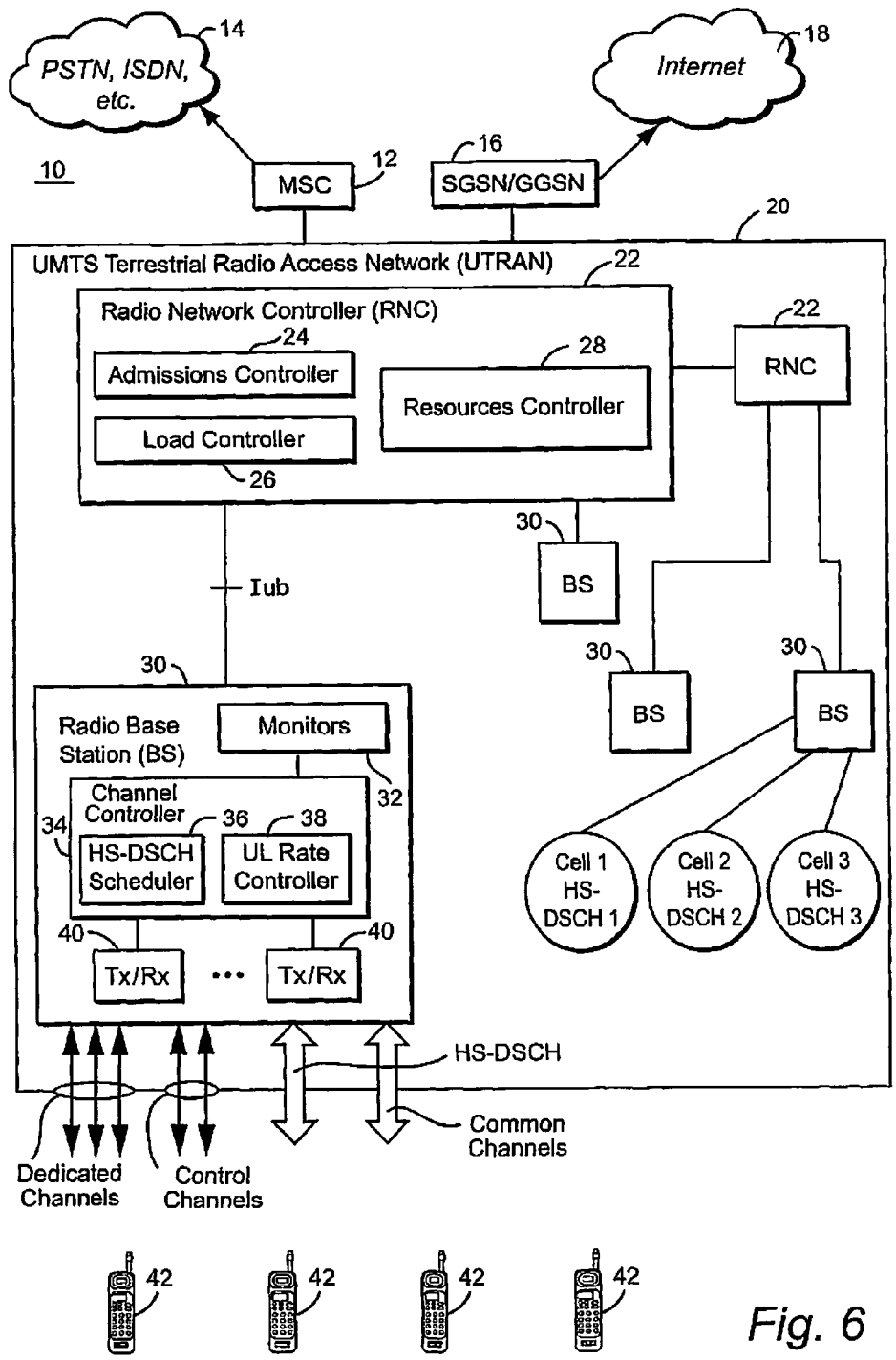
FIG. 6 is a function block diagram illustrating one non-limiting example implementation for the procedures outlined in FIG. 5.

Reference is made to a non-limiting example mobile communication system 10 shown in FIG. 6. Plural external networks are coupled to a CDMA-based radio access network 20 which, for example, may be a UMTS Terrestrial Radio Access Network (UTRAN) via an associated core network node. For example, network cloud 14 including the public switched telephone network (PSTN), integrated services digital network (ISDN), etc. is coupled to the UTRAN 20 via a mobile switching center (MSC) 12. Network cloud 18 including the Internet is coupled to the UTRAN 20 via a general packet radio services (GPRS)-based switching node 16 like a gateway GPRS service node (GGSN) and/or serving GPRS support node (SGSN). The UTRAN 20 includes one or more radio network controllers (RNC) 22 which may communicate over a suitable interface. Each RNC 22 may include, among other things, an admissions controller 24 for controlling new connection requests via particular cells, a cell load controller 26 for controlling the load in the cells for which the RNC is responsible, and a resources controller 28 for controlling the allocation of resources in the cells for which the RNC is responsible. Each of the controller entities may be implemented in hardware, software, or a combination of both.

Each RNC 22 is coupled to one or more radio base stations (BS) 30. Each radio base station 30 is associated with one or more cells, and includes, among other things, radio transceiving circuitry 40, one or more monitors 32, and a channel controller 34 which includes a HS-DSCH scheduler 36 and an uplink rate controller 38. Each of these entities may be implemented in hardware, software, or a combination of both. The monitors 32 may include, for example, a HS-DSCH code usage monitor, a transport format usage monitor, an average load monitor, an empty buffer monitor, a power monitor, etc. which may or may not be used in managing resources of the HS-DSCH.

The radio base station 30 communicates over a radio interface with various mobile stations identified as user equipments (UEs) or mobile terminals (MTs) 42. Communications over the radio interface are made using spreading codes, i.e., one or more spreading codes corresponds to a radio channel. Each base station 30 employs different types of radio channels: one or more dedicated channels, one or more common channels, one or more broadcast channels, and for at least one base station, a high speed-downlink shared channel (HS-DSCH). Each of multiple cells associated with a single base station may have its own HS-DSCH.

The channel controller 34 may perform the various functions described above for the high speed downlink shared channel such as shared channel transmission, higher order modulation, link adaptation, radio channel dependent scheduling, and hybrid-ARQ with soft combining. Particularly, the HS-DSCH scheduler 36 controls fast scheduling of transmissions (and retransmissions) over the high speed downlink shared channel in each transmission time interval (TTI). The channel controller 34 preferably allocates all of the codes allocated to the high speed downlink channel to a single mobile radio MT 42 connection in one TTI. But if the payload is insufficient for a single MT connection, or if the MTs are low-end MTs, code division multiplexing may also be employed, as explained above with regard to FIG. 3.

In this example, the procedures in FIG. 5 are carried out in the mobile terminal (step S2) and the radio base station (steps S4-S12) using one or more monitors 32 and the uplink rate controller 38. This implementation may be preferred because the base station is "closer" to the radio interface and therefore can respond more quickly than the RNC which must receive information and send information via the base station. But one or more of steps S4-S12 could be implemented in the RNC or one or more external networks. Load, number of users, or other parameters may be determined by the RNC and provided to the base station or the base station may determine those parameters directly.

This technology allows the radio network to adapt or correlate the mobile terminal's uplink rate (within certain constraints) with a received downlink rate over a high speed downlink shared channel. The mobile user may thus attain the perception that the downlink and uplink data transmission rates are matched, which is beneficial for balanced services like voice-over-IP, multimedia, interactive gaming, video conferencing, etc. Radio resources are also used efficiently because uplink resources are not simply granted to a mobile terminal upon request. Rather, the radio channel conditions must be sufficiently favorable to warrant the allocation of limited uplink radio resources to support the uplink rate limit set for a particular mobile terminal for a particular uplink load in the cell.

While the invention has been described in connection with an example embodiment, it is not limited to a disclosed embodiment or example, but on the contrary, is intended to cover various modifications and equivalent arrangements included within the scope of the appended claims.

The invention claimed is:

1. A method for setting an uplink transmission rate limit for a mobile terminal operating in a mobile communications network supporting mobile radio communication using radio channels associated with a cell coverage area including a high speed downlink shared radio channel for transmitting information from the mobile communications network to mobile terminals and uplink channels for transmitting information from the mobile terminals to the mobile communications network, where a first one of the mobile terminals receives information from the mobile communications network over the high speed-downlink shared channel and transmits information to the mobile communications network over a first uplink channel, said method implemented by at least one of a base station and a radio network controller comprising the steps of:
  determining a first downlink channel quality associated with a first transmission of information over the high speed downlink shared radio channel to the first mobile terminal;
  determining a first uplink transmission rate limit for information to be transmitted over the first uplink channel by the first mobile terminal based on the first downlink channel quality;
  wherein the determined first uplink transmission rate limit is a function of the first downlink channel quality, a load associated with the first uplink channel, and a number of mobile terminals transmitting in uplink direction to the mobile communications network; and
  wherein the at least one of the base station and the radio network controller implements the first and second determining steps to determine the first uplink transmission rate limit for the first mobile terminal by monitoring the first downlink channel quality and scaling the first downlink channel quality to a reference value, wherein the reference value is determined by an uplink load, a number of mobile terminals in the cell coverage area, a subscription associated with the first mobile terminal, and a priority level associated with a mobile connection to the first mobile terminal.

2. The method as recited in claim 1, further comprising:
  determining a second downlink channel quality associated with a second transmission of information over the high speed downlink shared radio channel to a second one of the mobile terminals; and
  determining a second uplink transmission rate limit for information to be transmitted over a second uplink channel by the second mobile terminal based on the second downlink channel quality.

3. The method as recited in claim 2, wherein if the first downlink channel quality exceeds the second downlink channel quality, the first uplink transmission rate limit is greater than the second uplink transmission rate limit.

4. The method as recited in claim 2, further comprising:
  sending the first uplink transmission rate limit to the first mobile terminal and the second uplink transmission rate limit to the second mobile terminal.

5. The method as recited in claim 1, wherein the higher the first downlink channel quality, the higher the first uplink transmission rate limit up to a maximum rate limit value.

6. The method as recited in claim 1, wherein the first uplink transmission rate limit correlates with a downlink transmission rate capability to the first mobile terminal over the high speed downlink shared radio channel.

7. The method as recited in claim 1, wherein the first downlink channel quality is determined based on information received from the first mobile terminal.

8. The method as recited in claim 1, wherein the first uplink channel is a dedicated uplink traffic channel.

9. The method as recited in claim 1, wherein a data transmission rate of the information transmitted over the high speed downlink shared radio channel to the first mobile terminal is same as a data transmission rate of the information transmitted over the first uplink channel by the first mobile terminal.

10. The method as recited in claim 1, wherein the at least one of the base station and the radio network controller implements the first and second determining steps to individually determine the uplink transmission rate limit for each of the mobile stations based on the downlink channel quality measured by the respective mobile station.

11. An apparatus for setting an uplink transmission rate limit for a mobile terminal operating in a mobile communications network supporting mobile radio communication using radio channels associated with a cell coverage area including a high speed downlink shared radio channel for transmitting information from the mobile communications network to mobile terminals and uplink channels for transmitting information from the mobile terminals to the mobile communications network, where a first one of the mobile terminals receives information from the mobile communications network over the high speed-downlink shared channel and transmits information to the mobile communications network over a first uplink channel, said apparatus comprising:

means for determining a first downlink channel quality associated with a first transmission of information over the high speed downlink shared radio channel to the first mobile terminal;

means for determining a first uplink transmission rate limit for information to be transmitted over the first uplink channel by the first mobile terminal based on the first downlink channel quality;

wherein the determined first uplink transmission rate limit is a function of the first downlink channel quality, a load associated with the first uplink channel, and a number of mobile terminals transmitting in uplink direction to the mobile communications network; and wherein the first and second determining means determine the first uplink transmission rate limit for the first mobile terminal by monitoring the first downlink channel quality and scaling the first downlink channel quality to a reference value, wherein the reference value is determined by an uplink load, a number of mobile terminals in the cell coverage area, a subscription associated with the first mobile terminal, and a priority level associated with a mobile connection to the first mobile terminal.

12. The apparatus as recited in claim 11, further comprising:

means for determining a second downlink channel quality associated with a second transmission of information over the high speed downlink shared radio channel to a second one of the mobile terminals; and means for determining a second uplink transmission rate limit for information to be transmitted over a second uplink channel by the second mobile terminal based on the second downlink channel quality.

13. The apparatus as recited in claim 12, wherein if the first downlink channel quality exceeds the second downlink channel quality, the first uplink transmission rate limit is greater than the second uplink transmission rate limit.

14. The apparatus as recited in claim 12, further comprising:

means for sending the first uplink transmission rate limit towards the first mobile terminal and the second uplink transmission rate limit towards the second mobile terminal.

15. The apparatus as recited in claim 11, wherein the higher the first downlink channel quality, the higher the first uplink transmission rate limit up to a maximum rate limit value.

16. The apparatus as recited in claim 11, wherein the first uplink transmission rate limit correlates with a downlink transmission rate capability to the first mobile terminal over the high speed downlink shared radio channel.

17. The apparatus as recited in claim 11, wherein the means for determining a first uplink transmission rate limit is configured to determine the first downlink channel quality based on information received from the first mobile terminal.

18. The apparatus as recited in claim 11, wherein the first uplink channel is a dedicated uplink traffic channel.

19. A mobile radio communications system comprising:

an apparatus for setting an uplink transmission rate limit for a mobile terminal, said apparatus comprising:

means for determining a first downlink channel quality associated with a first transmission of information over a high speed downlink shared radio channel to the mobile terminal;

means for determining a first uplink transmission rate limit for information to be transmitted over a first uplink channel by the mobile terminal based on the first downlink channel quality; and wherein the determined first uplink transmission rate limit is a function of the first downlink channel quality, a load associated with the first uplink channel, and a number of mobile terminals transmitting in uplink direction to the mobile communications network; and wherein the first and second determining means determine the first uplink transmission rate limit for the first mobile terminal by monitoring the first downlink channel quality and scaling the first downlink channel quality to a reference value, wherein the reference value is determined by an uplink load, a number of mobile terminals in the cell coverage area, a subscription associated with the first mobile terminal, and a priority level associated with a mobile connection to the first mobile terminal.

20. The mobile radio communications system as recited in claim 19, wherein the system is a CDMA based system and the apparatus is implemented in a radio base station.

21. The mobile radio communications system as recited in claim 19, wherein the system is a CDMA based system and the apparatus is implemented using a radio network controller and a radio base station.

* * * * *